US008051651B2

(12) United States Patent
Cochran et al.

(10) Patent No.: US 8,051,651 B2
(45) Date of Patent: Nov. 8, 2011

(54) HYDRAULIC FLOW CONTROL SYSTEM

(75) Inventors: Gary Cochran, Colwich, KS (US); David S. Moorman, Bedford, IN (US); Mark D. Bird, Clearwater, KS (US)

(73) Assignee: Coneqtec Corp., Wichita, KS (US)

( * ) Notice: Subject to any disclaimer, the term of this patent is extended or adjusted under 35 U.S.C. 154(b) by 741 days.

(21) Appl. No.: 12/200,134

(22) Filed: Aug. 28, 2008

(65) Prior Publication Data

US 2009/0056325 A1 Mar. 5, 2009

Related U.S. Application Data

(60) Provisional application No. 60/969,015, filed on Aug. 30, 2007.

(51) Int. Cl.
*F16D 31/02* (2006.01)

(52) U.S. Cl. ............................... 60/428; 60/421; 60/486

(58) Field of Classification Search .................... 60/421, 60/428, 429, 486
See application file for complete search history.

(56) References Cited

U.S. PATENT DOCUMENTS

| | | | |
|---|---|---|---|
| 3,583,585 | A | 6/1971 | Joyce |
| 3,952,511 | A | 4/1976 | Turner et al. |
| 4,312,619 | A | 1/1982 | Anderson et al. |
| 4,779,416 | A | 10/1988 | Chatterjea et al. |
| 5,067,321 | A | 11/1991 | Miyaoka |
| 5,083,428 | A | 1/1992 | Kubomoto et al. |
| 5,127,227 | A | 7/1992 | Ikari |
| 5,136,846 | A | 8/1992 | Arii et al. |
| 6,018,895 | A | 2/2000 | Duppong et al. |
| 6,244,048 | B1 | 6/2001 | Tanaka et al. |
| 6,357,231 | B1 | 3/2002 | Duppong |
| 6,662,556 | B2 | 12/2003 | Bares et al. |
| 6,672,399 | B2 | 1/2004 | Sprinkle et al. |
| 6,990,807 | B2 | 1/2006 | Bird et al. |
| 7,017,674 | B2 | 3/2006 | Bell et al. |

FOREIGN PATENT DOCUMENTS

| | | |
|---|---|---|
| JP | 2006/194309 | 7/2006 |
| KR | 10-1999-0054725 | 7/1999 |
| KR | 10-2007-0069876 | 7/2007 |

OTHER PUBLICATIONS

UK Examination Report issued Mar. 21, 2011.
PCT Search Report issued Mar. 20, 2009.

*Primary Examiner* — Michael Leslie
(74) *Attorney, Agent, or Firm* — Woodard, Emhardt, Moriarty, McNett & Henry LLP

(57) ABSTRACT

A hydraulic system for use in a work vehicle with a powered implement is disclosed. In one embodiment, the hydraulic system may include a first hydraulic circuit including a first hydraulic pump with a low pressure and low flow output, switch and valve; a second hydraulic circuit including a second hydraulic pump with a high flow and high pressure output, switch and valve; and a third hydraulic circuit including a third hydraulic pump with a high flow and high pressure output, switch and valve. The first, second, and third circuits each include an output selectively combinable with each other by an operator control which controls the switch and valve configurations. The hydraulic system has several configurations. A first configuration is selectable to provide low pressure and low flow output to the implement, a second configuration is selectable to provide high pressure and high flow output to the implement from one of said second and third hydraulic circuits, a third configuration is selectable to provide high pressure and high flow output to the implement combining the output from the second and third hydraulic circuits, and a fourth configuration is selectable to provide low pressure and high flow output to the implement from said first, second and third hydraulic circuits.

20 Claims, 9 Drawing Sheets

HYDRAULIC FLOW CONTROL SYSTEM

This application claims the benefit of provisional application Ser. No. 60/969,015 filed Aug. 30, 2007, which is incorporated herein by reference.

FIELD OF THE INVENTION

The disclosed embodiments relate to hydraulic flow control systems. It is described in the context of a system that is added to prime movers, such as skid steer loaders, but is believed to be useful in other applications as well.

BACKGROUND

In normal use, a skid steer loader has a loader bucket pivotally attached to two front lift arms. Optionally, the loader bucket of a skid steer loader may be removed and alternate or auxiliary implements such as a flail mower, planer, saw, slot cutter, broom, tiller, auger, jack hammer, stump cutter, asphalt grinder, trencher, chipper, etc. may be attached. Some implements require a low pressure, low volume flow of hydraulic fluid to the implement. Alternately, certain hydraulic attachments, e.g. an asphalt grinder or trencher, require a high pressure and high volume flow. An under supply of pressure and flow volume will decrease an implement's effectiveness, while an over supply of pressure and flow volume will provide excess heat and wear on the components of a system.

It is desirable to provide an hydraulic flow control system so that an operator may selectively and easily choose a desired flow and pressure configuration supplied to an implement.

SUMMARY

A hydraulic system for use in a work vehicle with a powered implement is disclosed. In one embodiment, the hydraulic system may include a first hydraulic circuit including a first hydraulic pump with a low pressure and low flow output, switch and valve; a second hydraulic circuit including a second hydraulic pump with a high flow and high pressure output, switch and valve; and a third hydraulic circuit including a third hydraulic pump with a high flow and high pressure output, switch and valve. The first, second, and third circuits each include an output selectively combinable with each other by an operator control which controls the switch and valve configurations. The hydraulic system has several configurations. A first configuration is selectable to provide low pressure and low flow output to the implement, a second configuration is selectable to provide high pressure and high flow output to the implement from one of said second and third hydraulic circuits, a third configuration is selectable to provide high pressure and high flow output to the implement combining the output from the second and third hydraulic circuits, and a fourth configuration is selectable to provide low pressure and high flow output to the implement from said first, second and third hydraulic circuits.

In an alternate embodiment, an hydraulic system provides power to an implement on a skid steer loader, where the skid steer loader has a tool mounting location allowing hydraulically powered implements to be interchangeably mounted to the skid steer loader. The hydraulic system includes: a first hydraulic circuit including a first hydraulic pump with a low pressure and low flow output, a switch and a valve; where the switch and valve control the flow path of the pump; a second hydraulic circuit including a second hydraulic pump with a high pressure and high flow output, a switch and a valve; wherein the switch and valve control the flow path of the pump; and a third hydraulic circuit including a third hydraulic pump with a high pressure and high flow output, a switch and a valve; wherein the switch and valve control the flow path of the pump. An operator control is mounted to the vehicle at an operator location to selectively control the switches and valve to control the combination of the flow paths to achieve desired pressure and flow configurations delivered to the powered implement. A first configuration is selectable to provide low pressure and low flow output to the implement from the first hydraulic circuit. A second configuration is selectable to provide high pressure and high flow output to the implement from one of the second and third hydraulic circuits. A third configuration is selectable to provide high pressure and high flow output to the implement combining the output from the second and third hydraulic circuits; and, a fourth configuration is selectable to provide low pressure and high flow output to the implement from the first, second and third hydraulic circuits.

A further embodiment includes a method of controlling hydraulic power supplied to an implement associated with a support vehicle. The method includes providing a plurality of pumps controlled by a corresponding plurality of switches and valves with a paired switch and valve for each pump, wherein the pumps direct hydraulic flow to the valves, wherein each switch operates a valve to direct the hydraulic flow to a selected flow path, and wherein at least one pump has low flow and low pressure output and wherein at least a second pump has a high flow and high pressure output. The switches are remotely operated from an operator location to selectively control said valves to direct the hydraulic flow. Preferably, the switches selectively direct the hydraulic flow paths individually or in combination to the implement in desired pressure and flow volume configurations, where the configurations include a low pressure and low flow output to the implement from one pump, a high pressure and high flow output to the implement from one pump, a high pressure and high flow output combining the output from at least two pumps, and a low pressure and high flow output to the implement from the plurality of pumps.

Other objects and advantages of embodiments of the present invention are apparent from the description, figures and claims.

DETAILED DESCRIPTION OF THE ILLUSTRATED EMBODIMENTS

Figure 1:
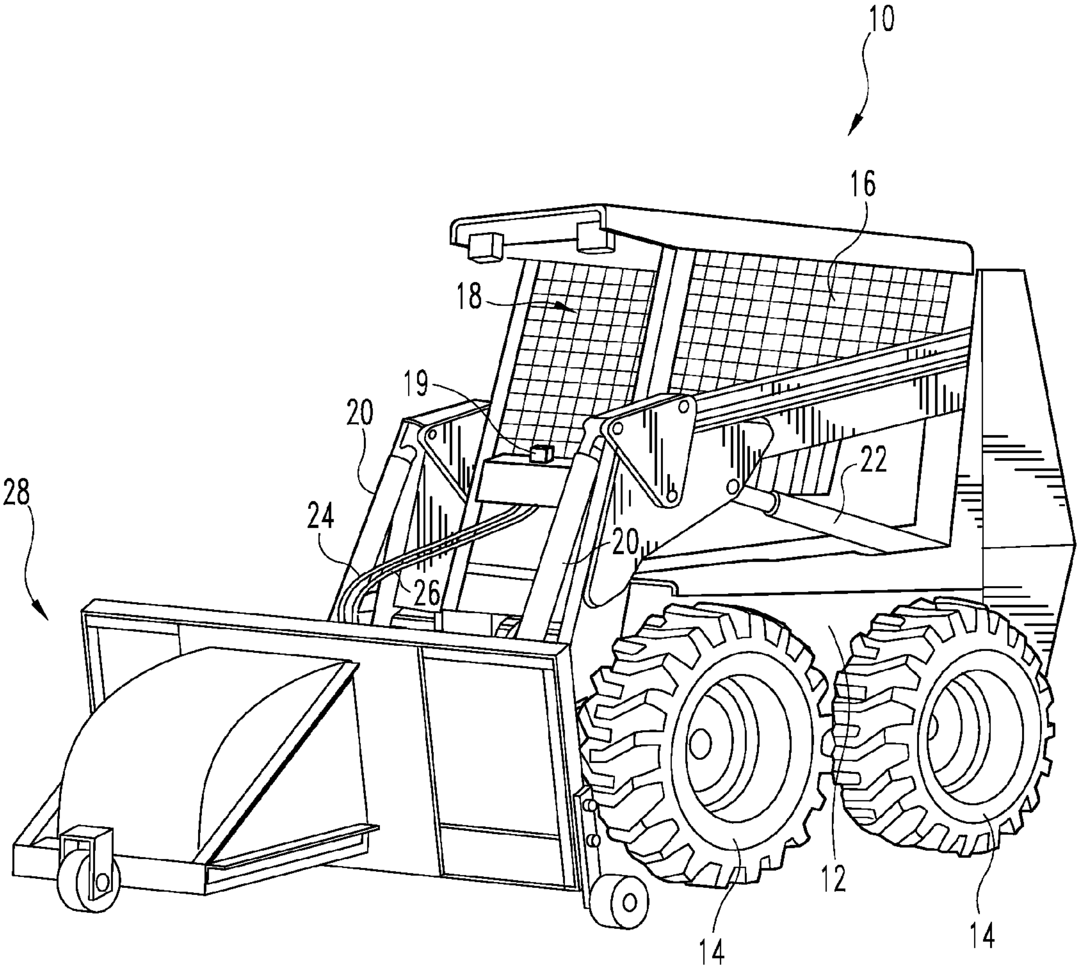
FIG. 1 is a perspective view of a skid steer loader and an example implement, which could be powered by the hydraulic circuit of FIG. 2.

For the purposes of promoting an understanding of the principles of the disclosure, reference will now be made to the embodiment illustrated in the drawings and specific language will be used to describe the same. It will nevertheless be understood that no limitation of the scope of the claims is thereby intended, such alterations and further modifications in the illustrated device, and such further applications of the principles of the disclosure as illustrated therein, being contemplated as would normally occur to one skilled in the art to which the disclosure relates.

Referring generally to FIG. 1 there is shown a skid steer loader as an example support vehicle. A typical skid steer loader 10 is a type of support vehicle having a frame 12, four wheels 14 or tracks, an operator position, such as a cage or cab 16 with a seat 18, and a pair of left and right front lift arms 20. Left and right hydraulic cylinders 22 may be paired with lift arms 20. Various alternate powered work tool implements may be interchangeably mounted to the skid steer loader, for example by being coupled and uncoupled from the lift arms 20.

Examples of powered tool implements include a flail mower, planer, saw, slot cutter, broom, tiller, auger, jack hammer, stump cutter, asphalt grinder, trencher, and chipper. Some implements require a low pressure, low volume flow of hydraulic fluid to the implement, while others need a high pressure and high volume flow.

The skid steer loader 10 has a hydraulic supply system 30, which may provide hydraulic power to an implement 28, typically via a hydraulic fluid pressure line 24 and a return line 26. The hydraulic supply system may also provide power to auxiliary positioning functions of the skid steer loader, such as arm and tilt functions and/or for positioning the implement.

Figure 2:
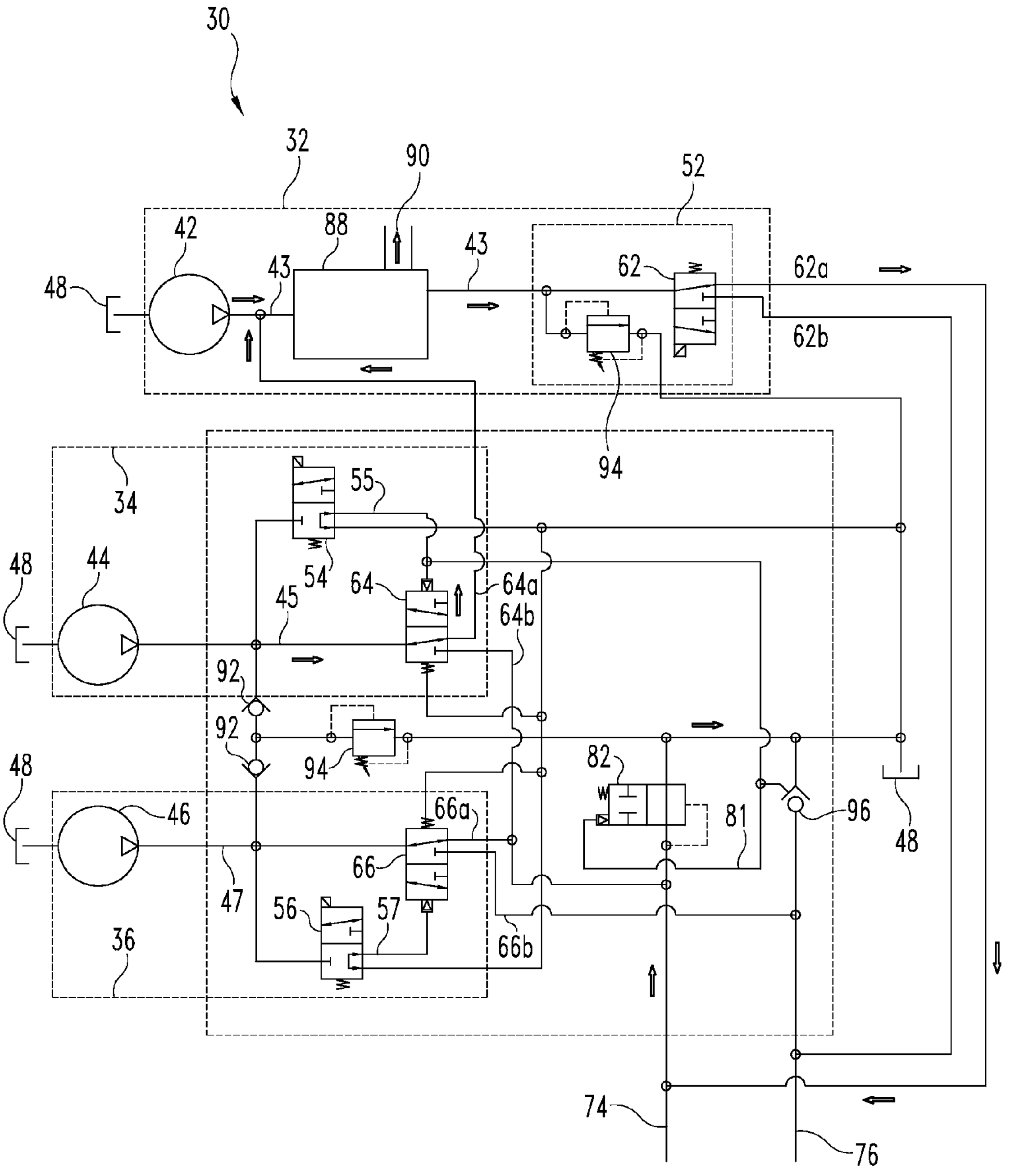
FIG. 2 is a diagram of an embodiment of a hydraulic circuit.
Figure 3:
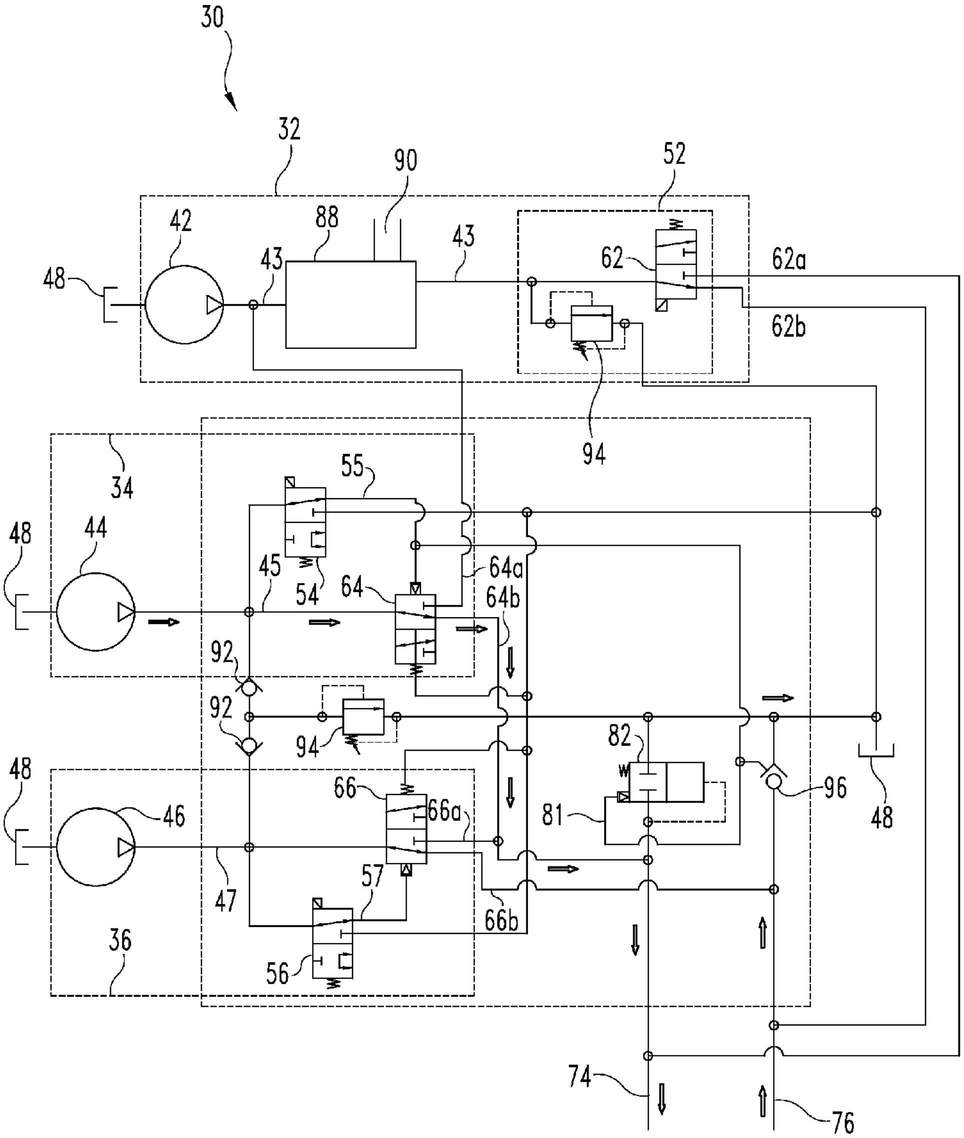
FIGS. 3-9 are diagrams detailing the hydraulic flow of various flow configurations of the hydraulic circuit shown in FIG. 2.
Figure 4:
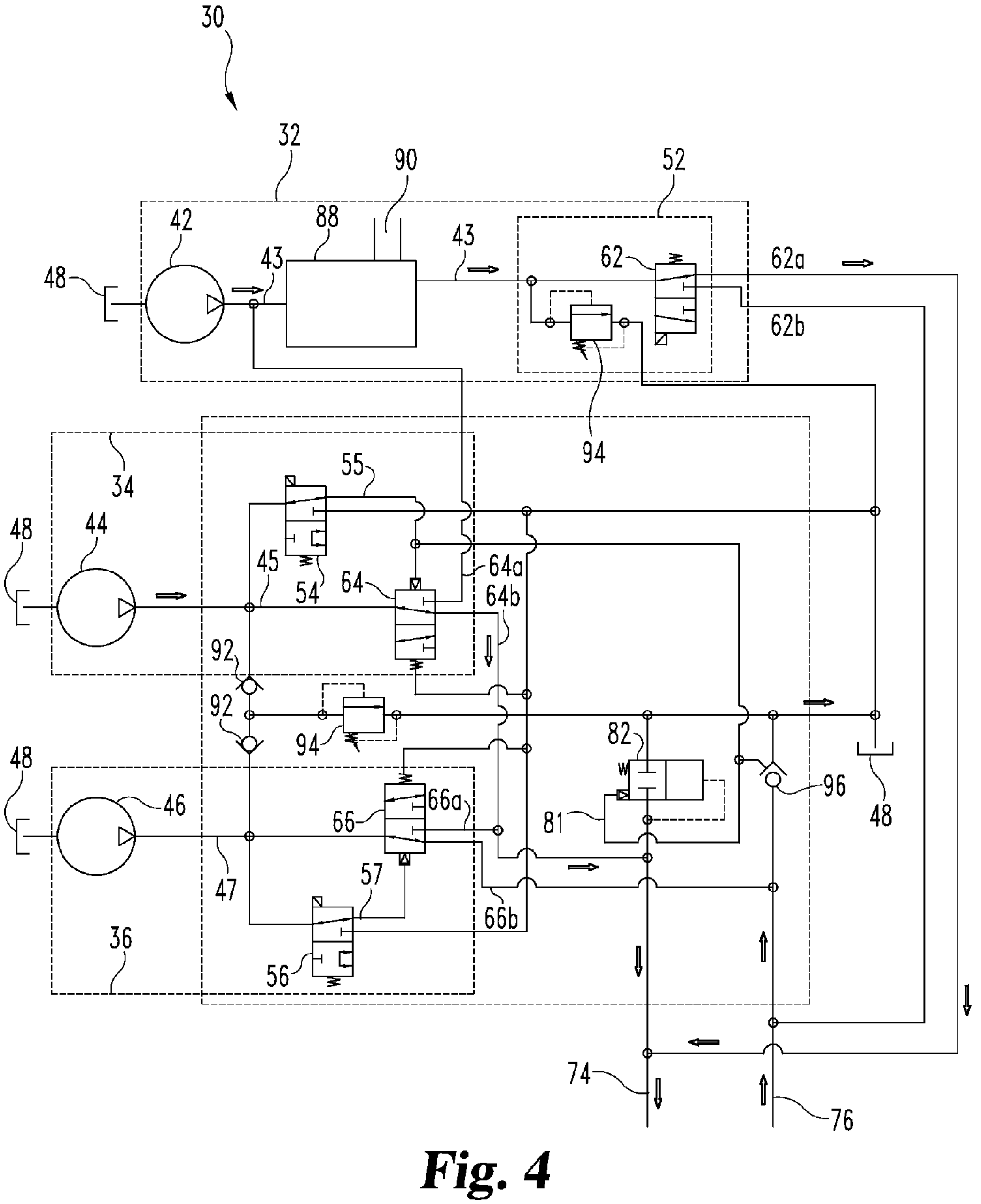
Figure 5:
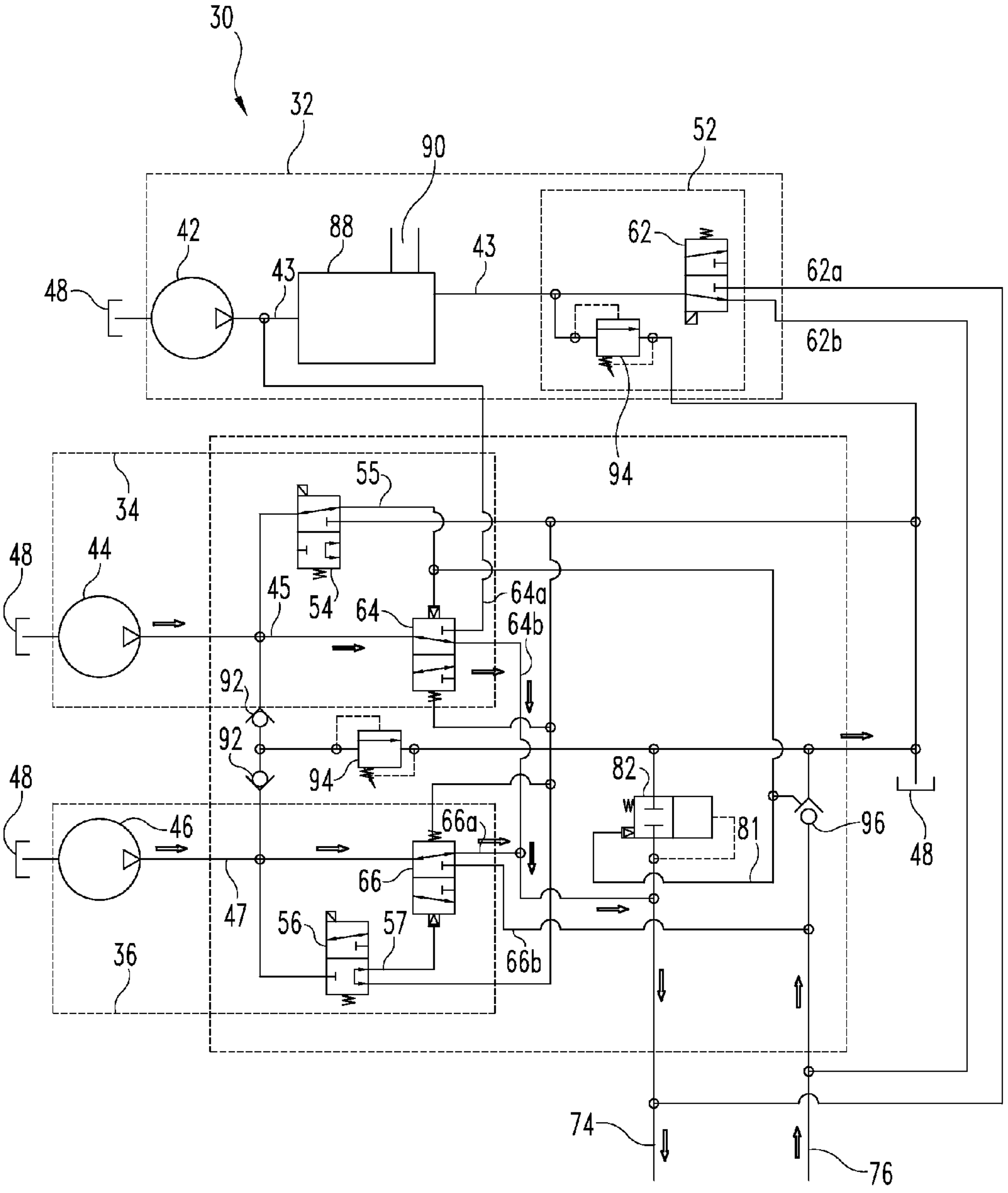
Figure 6:
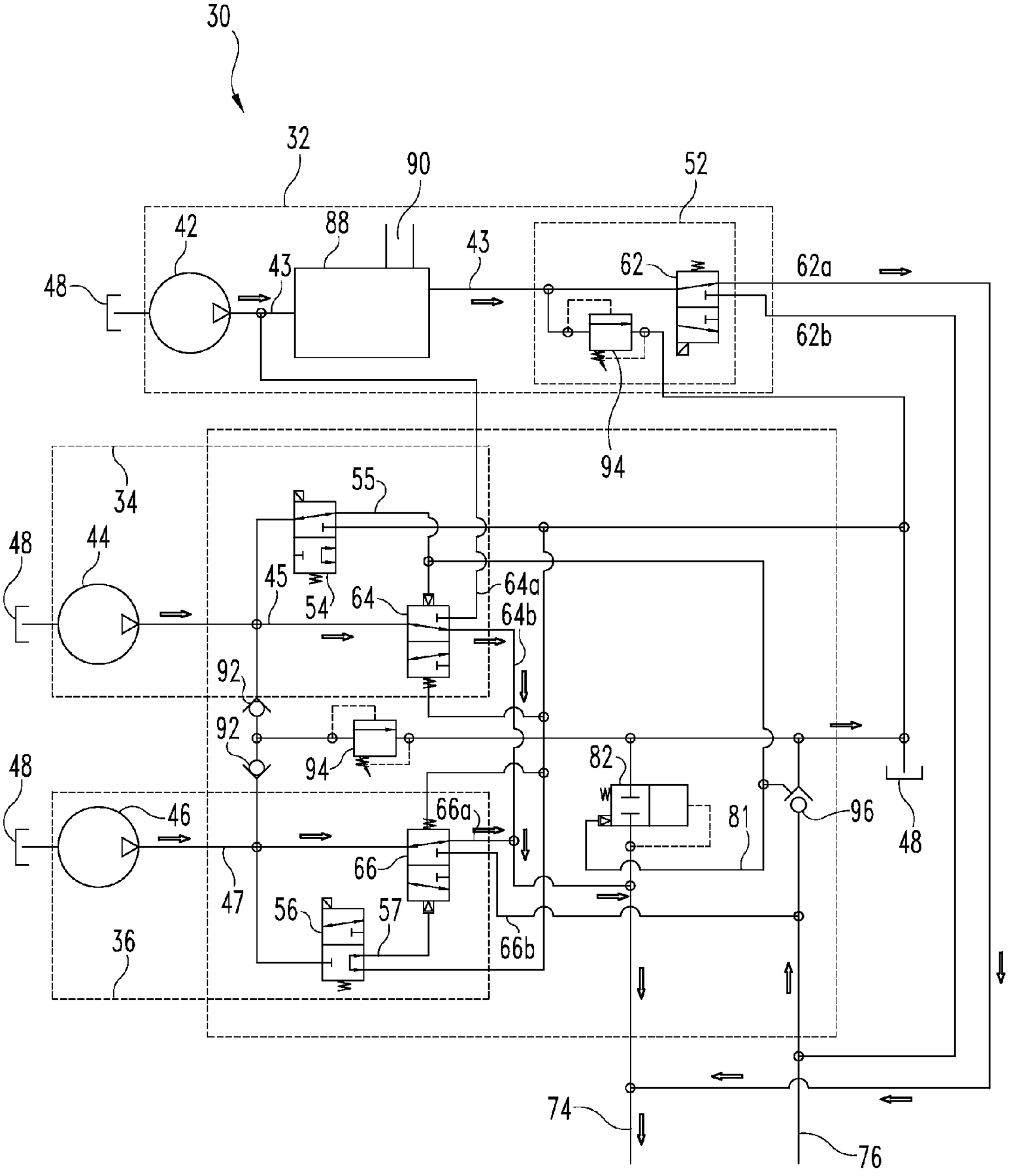
Figure 7:
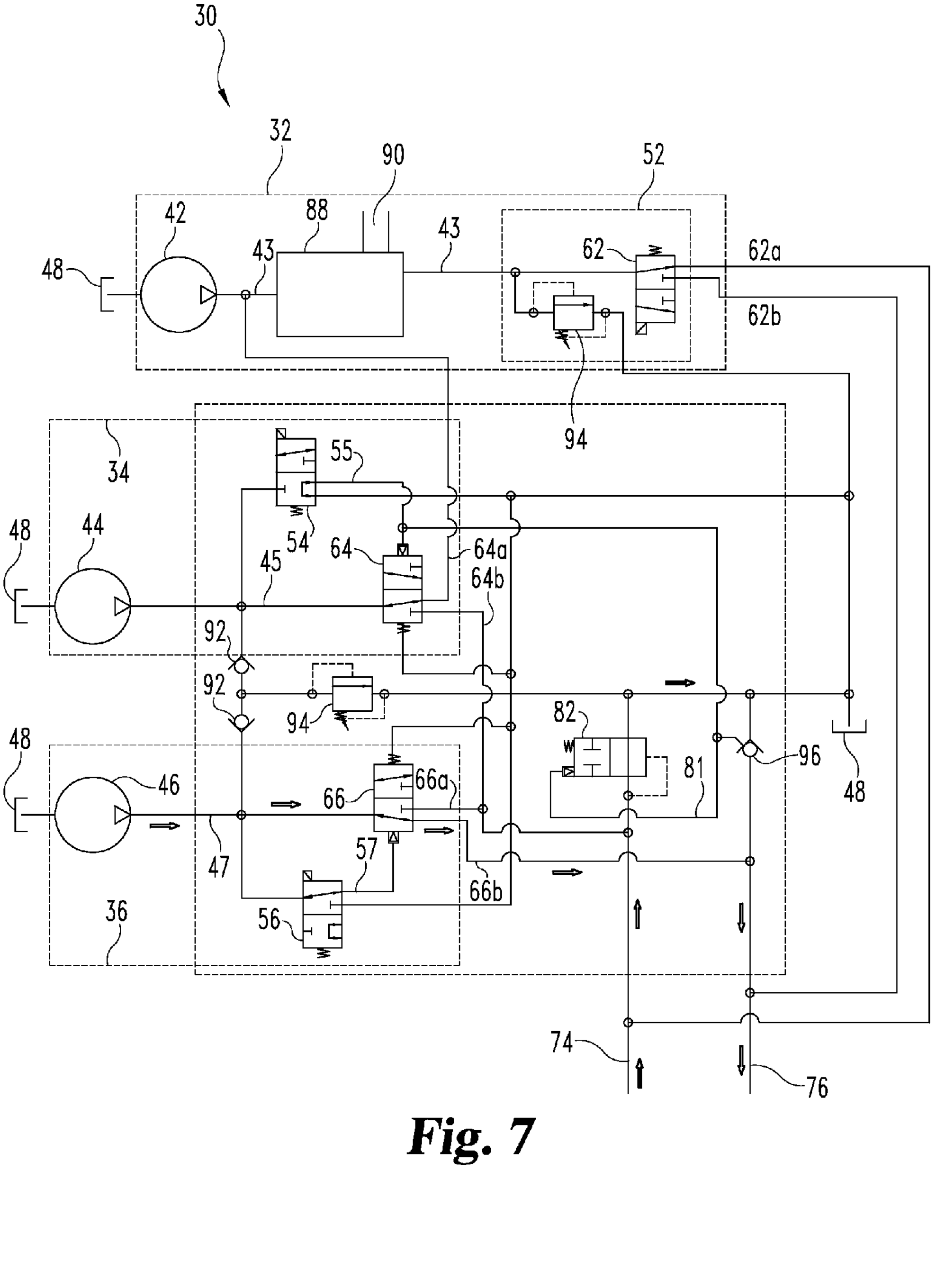

A diagram representing hydraulic control system 30 is shown in FIG. 2. Hydraulic control system 30 selectively directs output from pumps 42, 44 and/or 46 to a forward/pressure supply path 74 or to a reverse/return supply path 76 via respective lines 24 and 26 for an implement. Reverse/return path 76 directs hydraulic fluid back to tank 48 when the implement is used in a typical, forward pressure configuration.

In the embodiment illustrated, hydraulic control system 30 includes three interrelated hydraulic circuits, a first hydraulic circuit 32, a second hydraulic circuit 34, and a third hydraulic circuit 36. Each of the hydraulic circuits 32, 34, and 36 has a hydraulic pump 42, 44, and 46, respectively; a switch 52, 54, and 56, respectively, and a switched directional control valve 62, 64 and 66 respectively. Pumps 42, 44 and 46 are powered by the support vehicle, typically from the engine. Additional pumps and interrelated circuits can be added if desired. In some configurations, pumps 42, 44 and 46 can be selectively turned on or off as desired. The hydraulic fluid is normally drawn from tank 48 by each pump and returned to tank 48 after use.

The first hydraulic circuit 32 provides output along flow path 43 from pump 42 to a directional control valve 62 controlled by switch 52. Switch 52 operates valve 62 to direct output along flow path 62*a* to forward/pressure supply path 74 to the implement. In the alternate position, switch 52 operates valve 62 to direct output along flow path 62*b* to the reverse flow path for the implement. Switch 52 and valve 62 may optionally be a combined unit which is preferably electrically controlled remotely by the operator.

In the embodiment illustrated, the output from pump 42 is directed to optional loader valve 88. Loader valve 88 allows hydraulic flow to be diverted to an auxiliary circuit 90 as needed. An example auxiliary circuit is a positioning control for the loader arms or the implement.

The second hydraulic circuit 34 provides output along flow path 45 from pump 44 to a directional valve 64 controlled by switch 54. In selected flow path 64*a*, the output flow is combined with flow path 43 output from the first circuit 30 and leads to loader valve 88, switch 52 and valve 62. In selected flow path 64*b*, the output flow is combined with the output from the third hydraulic circuit and directed to forward/pressure supply path 74 to the implement. Switch 54 is preferably electronically controlled remotely by the operator to operate valve 64. As illustrated, switch 54 selectively controls a pilot fluid line 55 to valve 64. When pressure is supplied to or relieved from pilot line 55, it hydraulically directs the output of valve 64 to a desired output flow path.

The third hydraulic circuit 36 provides output along flow path 47 from pump 46 to a directional valve 66 controlled by switch 56. In selected flow path 66*a*, the output flow is directed to forward/pressure supply path 74 to the implement, and may be combined with flow path 64*b* output from the second circuit 34 and/or flow path 62*a* from first circuit 32. In selected flow path 66*b*, the output flow is directed to the reverse flow path for the implement, and optionally can be combined with output flow path 62*b* from first circuit 32. Switch 56 is preferably electrically controlled remotely by the operator to operate valve 66. As illustrated, switch 56 selectively controls a pilot fluid line 57 to valve 66. When pressure is supplied to or relieved from pilot line 57, it hydraulically directs the output of valve 66 to a desired output flow path.

System 30 includes switched valve 82 which when open allows fluid in the normally forward fluid path to flow to tank 48, this allows a reverse flow configuration. Valve 82 is normally in a closed position and directs forward fluid path flow to supply path 74. Valve 82 works in cooperation with check valve 96 on the return flow path 76. When valve 82 is in a closed position, check valve 96 is opened to allow fluid flow in the return flow path to flow to tank 48. When valve 82 is open for a reverse flow configuration, check valve 96 is closed. In the example shown, valve 82 and check valve 96 are controlled simultaneously by a pilot line 81 switched by switch 54. Valve 82 is preferably automated to be open when a reverse configuration is selected, and may be electronically controlled or may be controlled by a pilot line 81 which is supplied with pressure or relieved from pressure, according to a desired embodiment, when a reverse flow configuration is selected.

Switches 52, 54 and 56 are preferably electrically controlled, for example with solenoids. Switches 54 and 56 are pilot control valves that provide pressure to control directional valves 64 and 66, while valve 62 is directly controlled. These switching and shifting components can be substituted with each other or varied with appropriate modifications by those of skill in the art. System 30 preferably includes conventional check valves 92 and safety release valves 94 to prevent over pressure situations.

System 30 has several possible configurations to provide desired pressure and flow volume to implement 28 in either a forward or reverse direction. These configurations are preferably remotely controlled by an operator, for example with a control panel or switch 19 adjacent an operator seat in the cab of a control vehicle. In certain configurations, hydraulic power not directed to the implement may be available for use in an auxiliary circuit 90. The switch 19 may be mechanical or electronic. Suitable wiring, a power supply and related conventional components are not shown for convenience.

The above described hydraulic circuit can provide power in different pressures values and flow rates, as high pressure, low pressure, low flow and high flow. The exact determination of each of these terms is relative—high pressure is relative to low pressure, etc. Generally, the above system has been discussed in a system where the pumps have a gallon per minute output. By way of example, the first pump 42 may be a low pressure, low volume pump supplying a flow of approximately 8 GPM at pressure of approximately 3000 PSI. As further examples, second and third pumps 44 and 46 may be higher pressure, higher volume pumps, for example supplying a flow of approximately 16 GPM each at approximately 4500 PSI. Optionally, in addition to the valves controlling the output paths, the pumps can be individually turned on or off to provide power capacity to the system. These references to specific capacity are not considered limiting; other variations of flow output are contemplated such as pumps with different fixed flow rates and/or variable output pumps.

As specifically described in the embodiment of the hydraulic apparatus above, high pressure is generally considered more than 4000 PSI, with a common value of approximately 4500 PSI. Low pressure is generally considered less than 4000 PSI with a common value of approximately 3000 PSI. These examples are considered design-based numbers and the pressure in actual operation may vary depending on the system set-up and load.

Examples of flow configurations are discussed below and illustrated in FIGS. 3-9. Active, primary flow paths for the respective configuration are indicated by arrows.

In one configuration (FIG. 2), circuits 32 and 34 are engaged to provide a low volume, low pressure hydraulic fluid supply to auxiliary circuit 90. Using the example specifications, this would provide the auxiliary circuit up to 24 GPM at 3000 PSI with no flow to the implement.

A further configuration (FIG. 3) provides high pressure and high flow output to the implement 28 from one of said second hydraulic circuit 34. Using the example specifications, this would provide the implement 16 GPM at 4500 PSI, and 8 GPM at 3000 PSI (not shown with flow arrows) would be available for auxiliary circuit 90.

In an alternate configuration (FIG. 4), the output from second circuit 34 is switched to combine with the output from first circuit 32 to supply a combined volume output at low pressure to implement 28. In this embodiment, first circuit 32 applies a limit, to limit the pressure of the combined output. Using the example specifications, this would provide the implement 24 GPM at 3000 PSI.

A still further configuration (FIG. 5) provides high pressure and high flow output to the implement 28 combining the output from said second and third hydraulic circuits 34 and 36. Using the example specifications, this would provide the implement 32 GPM at 4500 PSI and 8 GPM at 3000 PSI (not shown with flow arrows) would be available for auxiliary circuit 90.

In a separate configuration (FIG. 6), the output of the first, second and third hydraulic circuits are combined to provide a high flow, low pressure output to the implement. Using the example specifications, this would provide the implement 40 GPM at 3000 PSI.

Figure 8:
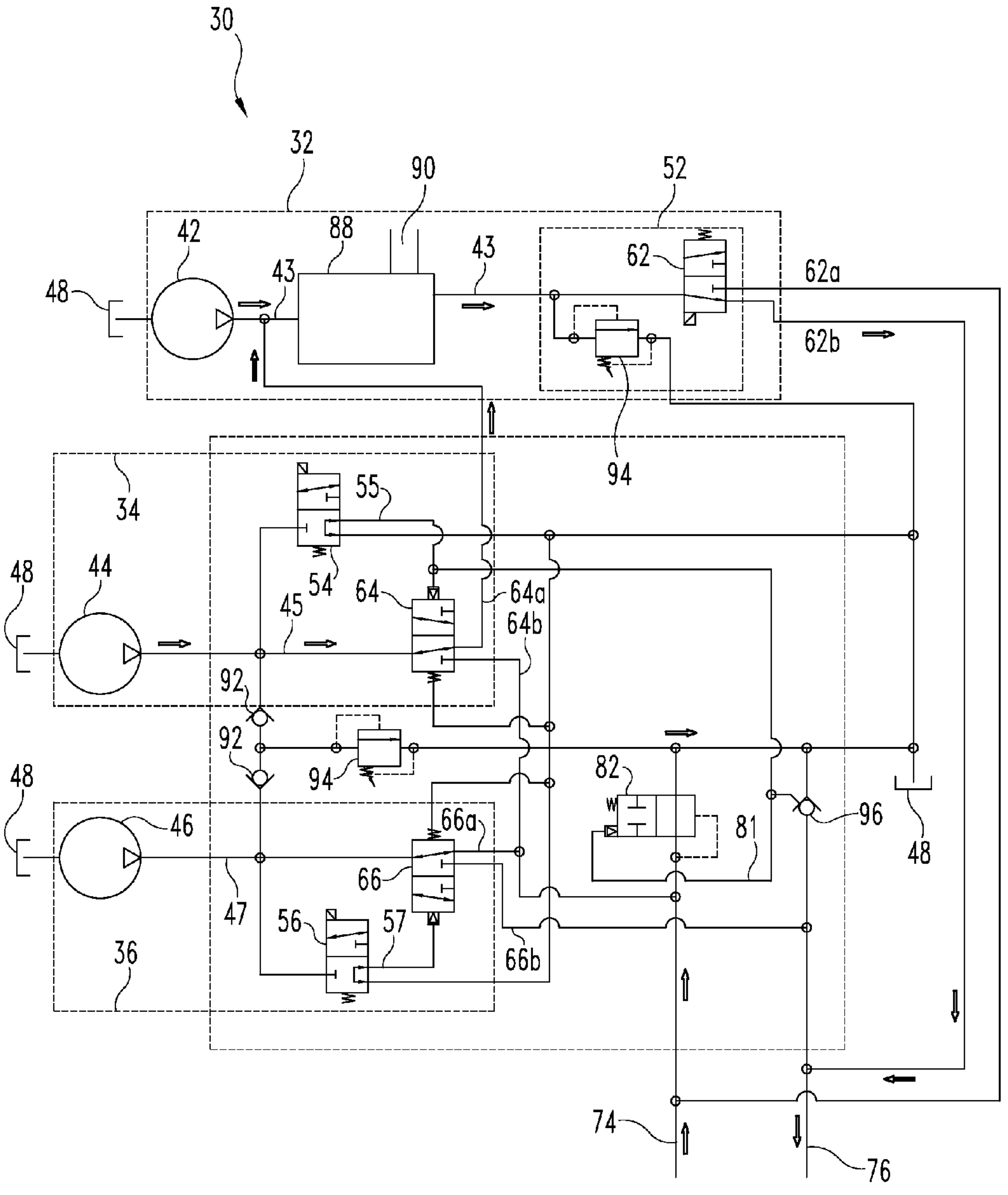
Figure 9:
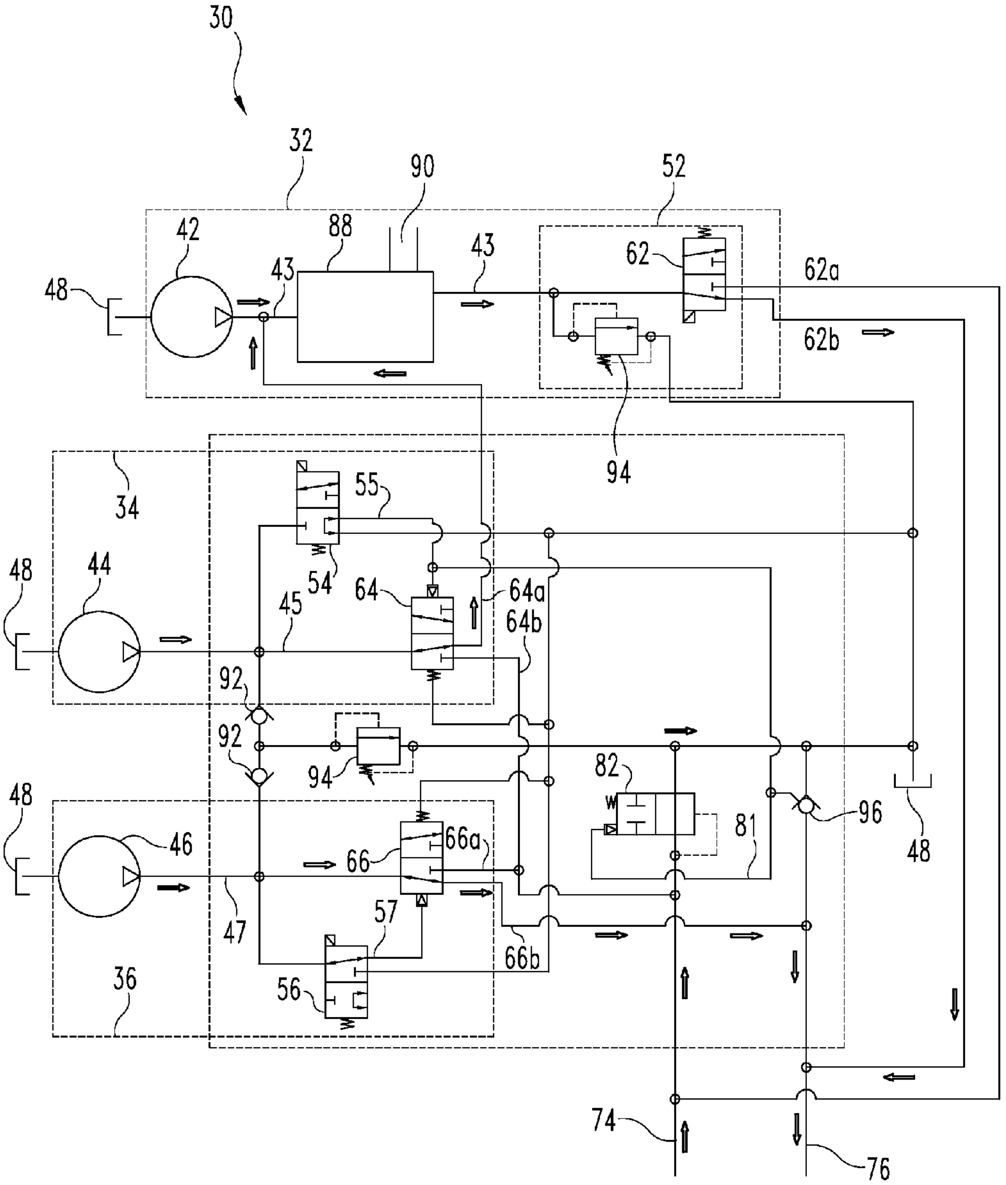

Alternate configurations allow flow from one or all of said first, second and third circuits 32, 34 and 36 to be directed in a reverse flow to implement 28 at a respective individual or combined volume. Third circuit 36 can provide flow at a high pressure alone in reverse (FIG. 7), (e.g., 16 GPM at 4500 PSI with 24 GPM at 3000 PSI available for auxiliary circuit 90) or circuit 34 can provide a combined low pressure reverse flow (e.g., 24 GPM at 3000 PSI) when combined with first circuit 32 (FIG. 8). Still further, the output from second circuit 34 can optionally be directed through first circuit 32 and combined with third circuit 36 in a reverse flow direction to provide 40 GPM at 3000 PSI (FIG. 9).

The disclosed hydraulic apparatus may provide a more efficient system, generating less excess heat and fewer excess pressure drops, while providing adequate flow and pressure for a variety of powered hydraulic attachments. It enables various permutations of high flow and high pressure and low flow and low pressure. Manual reconfiguration of implements and valves is not necessary, as an operator may remotely determine whether pressure and flow will be high or low and appropriately configure the switches and thus the valves for the amount of flow and pressure needed.

Additionally, if some positioning or auxiliary functions are needed during use of the implement, flow may be automatically entirely or partially diverted via the loader valve.

Further, the total system flow path is minimized. Each of the circuits shares, at least partially, its conduits, thereby reducing the hoses, filters, coolers, and conduits hydraulic fluid flows through. The total flow of hydraulic fluid through the system is increased insubstantially when compared to the amount of increased power that is provided to an implement. Much of the flow, and all high-pressure flow, is through bi-directional valves, which may reduce pressure drops, may increase efficiency and may decrease heat generated by the system.

The hydraulic apparatus has been described in the context of its use in a skid steer loader; however, it should be understood that the present hydraulic apparatus is not limited to use in a skid steer loader. The hydraulic apparatus may be used with other loaders or work vehicles, or even in non-work vehicles or stationary apparatus where selective variability of flow and pressure in a hydraulic system is desired.

While the illustrated embodiments have been detailed in the drawings and foregoing description, the same is to be considered as illustrative and not restrictive in character, it being understood that only the preferred embodiment has been shown and described and that all changes and modifications that come within the spirit of the invention are desired to be protected. The articles "a", "an", "said" and "the" are not limited to a singular element, and include one or more such elements.

What is claimed is:

1. An hydraulic system to power an implement associated with a support vehicle, comprising:

a first hydraulic circuit including a first hydraulic pump with a low pressure and low flow output, a switch and a valve; wherein said switch and valve control the flow path of said pump;

a second hydraulic circuit including a second hydraulic pump with a high pressure and high flow output, a switch and a valve; wherein said switch and valve control the flow path of said pump;

a third hydraulic circuit including a third hydraulic pump with a high pressure and high flow output, a switch and a valve; wherein said switch and valve control the flow path of said pump;

an operator control mounted to the vehicle at an operator location to selectively control said switches and valves to control the combination of said flow paths to achieve configurations of desired pressure and flow supplied to a powered implement;

wherein a first configuration is selectable to provide low pressure and low flow output to the implement from said first hydraulic circuit;

wherein a second configuration is selectable to provide high pressure and high flow output to the implement from one of said second and third hydraulic circuits;

wherein a third configuration is selectable to provide high pressure and high flow output to the implement combining the output from said second and third hydraulic circuits; and, wherein a fourth configuration is selectable to provide low pressure and high flow output to the implement from said first, second and third hydraulic circuits.

2. The system of claim 1, wherein said operator control is selectable to achieve a flow configuration where one of said second and third hydraulic circuit outputs is combined with said first hydraulic circuit output to provide a low pressure and high flow output to the tool implement.

3. The system of claim 1, wherein said operator control is selectable to achieve a flow configuration providing flow output to the tool implement in reverse.

4. The system of claim 3, wherein said operator control is selectable to achieve a flow configuration where at least one of said first and third hydraulic circuits provide flow output to the tool implement in reverse.

5. The system of claim 4, wherein said operator control is selectable to achieve a flow configuration where both of said second and third hydraulic circuits provide flow output to the tool implement in reverse.

6. The system of claim 1, wherein at least said second and third hydraulic circuit switches are electrically controlled and wherein at least said second and third hydraulic circuit valves are hydraulically controlled.

7. The system of claim 5, wherein said first hydraulic circuit switch controls said first hydraulic circuit valve to direct the output of said first pump to flow in a forward direction to the implement or to flow in a reverse direction to the implement.

8. The system of claim 5, wherein said second hydraulic circuit switch controls said second hydraulic circuit valve to combine the output of said second pump with the output of said first hydraulic circuit or said third hydraulic circuit.

9. The system of claim 5, wherein said third hydraulic circuit switch controls said third hydraulic circuit valve to direct the output of said third pump to flow in a forward direction to the implement or to flow in a reverse direction to the implement.

10. The system of claim 1, wherein said operated control is located adjacent a seat at an operator position of the support vehicle.

11. The system of claim 1, wherein the output of said first pump is automatically diverted to an auxiliary circuit as needed.

12. An hydraulic system for providing power to an implement on a skid steer loader, comprising:

a skid steer loader;

a tool mounting location on said skid steer loader, allowing hydraulically powered implements to be interchangeably mounted to said skid steer loader;

wherein said skid steer loader includes an hydraulic system configured to deliver hydraulic power to a powered implement mounted at said tool mounting location;

wherein said hydraulic system includes:

a first hydraulic circuit including a first hydraulic pump with a low pressure and low flow output, a switch and a valve; wherein said switch and valve control the flow path of said pump;

a second hydraulic circuit including a second hydraulic pump with a high pressure and high flow output, a switch and a valve; wherein said switch and valve control the flow path of said pump;

a third hydraulic circuit including a third hydraulic pump with a high pressure and high flow output, a switch and a valve; wherein said switch and valve control the flow path of said pump;

an operator control mounted to said vehicle at an operator location to selectively control said switches and valves to control the combination of said flow paths to achieve desired pressure and flow configurations delivered to a powered implement;

wherein a first configuration is selectable to provide low pressure and low flow output to the implement from said first hydraulic circuit;

wherein a second configuration is selectable to provide high pressure and high flow output to the implement from one of said second and third hydraulic circuits;

wherein a third configuration is selectable to provide high pressure and high flow output to the implement combining the output from said second and third hydraulic circuits; and, wherein a fourth configuration is selectable to provide low pressure and high flow output to the implement from said first, second and third hydraulic circuits.

13. The system of claim 12, wherein said operator control is selectable to achieve a flow configuration providing flow output to the tool implement in reverse.

14. The system of claim 13, wherein said operator control is selectable to more than one flow configuration with differing pressure and flow output to the tool implement in reverse.

15. The system of claim 12, wherein the output of at least one pump is automatically diverted to an auxiliary circuit as needed.

16. A method of controlling hydraulic power supplied to an implement associated with a support vehicle, comprising:

providing a plurality of pumps controlled by a corresponding plurality of switches and valves with a paired switch and valve for each pump, wherein said pumps direct hydraulic flow to said valves, wherein each switch operates a valve to direct the hydraulic flow to a selected flow path, and wherein at least one pump has low flow and low pressure output and wherein at least a second pump has a high flow and high pressure output;

remotely operating said switches from an operator location to selectively control said switches to direct the hydraulic flow;

selectively directing the hydraulic flow paths individually or in combination to the implement in desired pressure and flow volume configurations, wherein said configurations include a low pressure and low flow output to the implement from one pump, a high pressure and high flow output to the implement from one pump, a high pressure and high flow output combining the output from at least two pumps, and a low pressure and high flow output to the implement from said plurality of pumps.

17. The method of claim 16, wherein said switches are electrically controlled.

18. The method of claim 17, wherein at least one of said plurality of paired switches and valves has a switch controlling a hydraulic pilot line to hydraulically control said paired valve.

19. The method of claim 16, wherein at least one pressure and flow volume configuration is directed to the implement in a direction reverse to the implement's normal operation.

20. The method of claim 16, comprising automatically diverting hydraulic flow to an auxiliary circuit as needed.

* * * * *